United States Patent Office 3,055,818
Patented Sept. 25, 1962

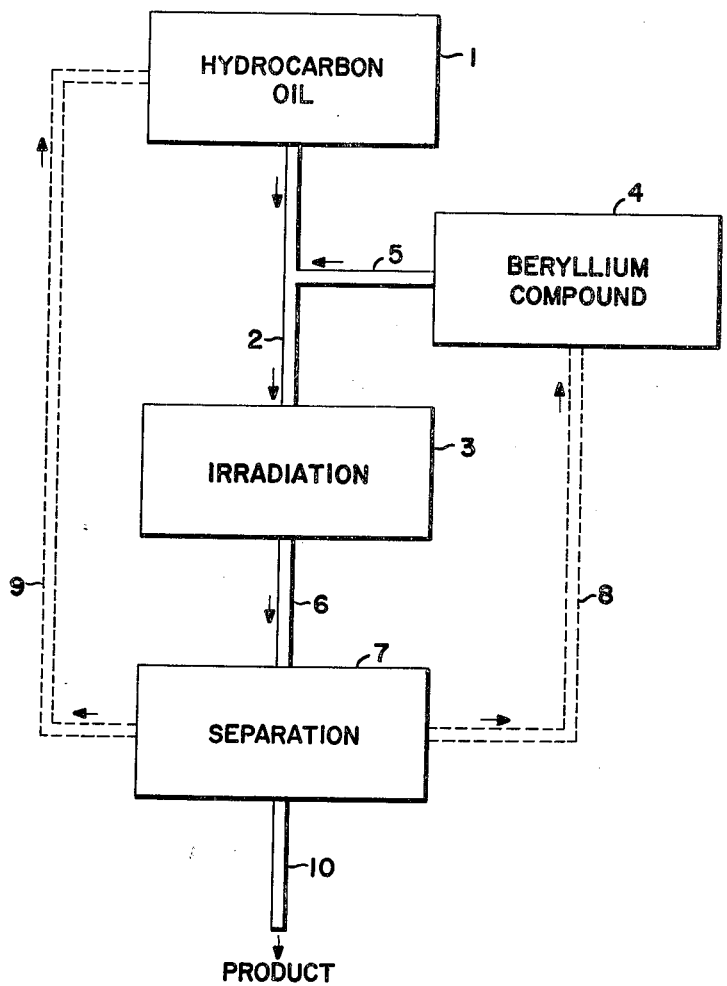

3,055,818
RADIOCHEMICAL CONVERSION OF HYDROCARBONS
Donald S. McArthur and Peter J. Lucchesi, Cranford, and Robert B. Long, Wanamassa, N.J., assignors to Esso Research and Engineering Company, a corporation of Delaware
Filed July 30, 1956, Ser. No. 600,995
2 Claims. (Cl. 204—158)

This invention relates to radiochemistry and particularly relates to an improved method for effecting the conversion of organic materials by exposure to high intensity ionizing radiation, comprising gamma rays, in the presence of finely divided beryllium.

In brief compass, this invention proposes an improved radiochemical process which comprises irradiating an organic material with high intensity ionizing radiation, comprising gamma rays, with the organic material being in intimate contact with finely divided beryllium or compounds thereof.

This invention proposes an improved method for inducing and controlling radiochemical reactions. It has been found that the presence of beryllium, specifically the isotope beryllium 9, in finely divided form, not only greatly accelerates the reaction, but also exerts an appreciable effect on the selectivity of the reaction. According to this invention, the time requirements for effecting radiochemical reactions are substantially reduced and the selectivity of the reaction is materially improved.

Beryllium 9 is 100% abundant in nature and therefore only the term "beryllium" will be used. The improved results of this invention are due to the reaction of gamma rays with the beryllium to give neutrons, and beryllium 8, which almost immediately disintegrates into two helium nuclei.

The beryllium can be used in pure elemental form, or can be used as compounds thereof. It is an important concept of the present invention to maintain the beryllium in a finely divided state in intimate contact with the organic reactant. Preferably, when using pure elemental beryllium, the beryllium exists as particles under 1 micron in size. These particles can be carried as such by the organic reactant, or can be carried on suitable porous subdivided solids such as carbon or coke, kieselguhr, alumina, metal particles, glasses, and the like. Certain compounds of beryllium such as beryllium aluminum silicates, beryllium carbides, beryllium fluoride and beryllium oxide can be used in the same manner, i.e. either as discrete particles of the compound, or carried on suitable carriers. It is advantageous in certain applications to use oil or water soluble compounds of beryllium, such as beryllium bromide, beryllium chloride, beryllium fluoride, beryllium nitrate and beryllium alkyls such as beryllium diethyl. About 5 to 10 wt. percent water is used in this embodiment of the invention. The beryllium halides and beryllium nitrate are the preferred water soluble compounds used. Water soluble compounds are particularly advantageous because they can be emulsified with the organic reactant and then, after irradiation, can be recovered by relatively simple means such as settling.

A particularly preferred embodiment of this invention is to use elemental beryllium, or a compound or beryllium, such as beryllium aluminum silicates and beryllium carbonate carried on the surface of a hydrocarbon conversion catalyst, e.g., a cracking catalyst such as silica-alumina, or a hydrogenation catalyst such as platinum or molybdena on alumina. It has been found that the intimate association of beryllium with the catalyst profoundly influences the active centers of the catalyst, and thus controls the outcome and selectivity of the conversion.

The preferred catalysts used in conjunction with beryllium are the porous, dried, gel type hydrocarbon conversion catalysts known to the art, useful in such hydrocarbon conversion processes as gas oil cracking, naphtha reforming, polymerization and desulfurization. An example of a gel type catalyst is a solid derived from the drying of a hydrous oxide of such materials as alumina, silica, zirconia, titania, magnesia, zinc aluminate and mixtures thereof. These hydrocarbon conversion catalysts can be derived from natural sources such as from bauxite, or can be manufactured such as by the alcoholate alumina method, or by precipitation from an aluminum sulfate solution.

The preferred catalysts are highly porous and have a surface area over 50 m.$^2$/gr. and a pore volume greater than 0.2 cm.$^3$/gr. These properties can be imparted by known methods, e.g., calcining, chemical treatment, rate of precipitation and similar methods. The catalysts preferably have a size in the range of 10 to 1000 microns, although larger size particles can be used such as pills or compactions. The hydrocarbon conversion catalysts can contain an additional component such as the elements, oxides or sulfides of platinum, molybdenum, palladium, nickel, rhodium and ruthenium, or the salts or oxides of potassium, calcium and magnesium.

The amount of elemental beryllium normally used in the practice of this invention is in the range of 0.1 to 20 wt. percent based upon the weight of material in the reaction zone. When used on a catalyst, normally about 0.1 to 5 wt. percent based on total catalyst composition is used.

This invention is applicable to a wide range of organic feed stocks such as oil, plastics, rubbers, saturated or olefinic hydrocarbons and oxygenated hydrocarbons (alcohols, aldehydes, acids, etc.). It is particularly applicable to hydrocarbon feed stocks including shale, shale oil, tar sand and tar sand oil, asphalt, synthetic oil and natural and artificial hydrocarbon gases. It is especially useful in the conversion of petroleum oils, for example, petroleum naphthas, gas oils, residua and whole crudes.

Depending upon the particular reaction conditions selected, the irradiation of petroleum oils is carried out to obtain removal of contaminates, hydrogenation, dehydrogenation, polymerization, desulfurization, cracking, alkylation, isomerization and/or aromatization.

The radiation is obtained from waste materials from nuclear reactors such as spent fuel elements, or from any artificially produced isotopes which emit gamma rays of energy greater than the threshold energy of the Be$^9$-gamma reaction, which is 1.67 mev., such as bismuth 207, yttrium 188, and iodine 134. In this form of the invention, the reactants are simply flowed past the radiation source in suitable conduits or containers.

These short-lived gamma emitters can best be used by providing means near a nuclear reactor such that the radioactive material can be used within a few hours after it is removed from the nuclear reactor. The intensity of the radiation source is preferably sufficient to create a gamma flux of at least about $10^5$ roentgens/hr. in the reaction zone. The conditions are so adjusted, preferably, that the oil receives a dosage of at least $10^3$ roentgens.

It is much preferred to carry out the conversion within a nuclear reactor such as an atomic pile. The reactant stream containing the catalyst, if any, is passed through the reactor or around the fissionable material in suitable pipes, being exposed thereby to high intensity ionizing radiation comprising gamma and neutron radiation. Moderators such as carbon, light or heavy water, or hydrocarbons can be employed. In some cases the feed stream itself can serve as a moderator.

When using a nuclear reactor, besides the above level of gamma radiation, it is preferred that the reaction zone be exposed to a neutron flux of at least $10^8$ neutrons/cm.$^2$/ sec., and that the conditions be so adjusted that the reactants receive a total dosage of at least 10⁴ ergs/gm./sec.

The following description of the drawing attached to and forming a part of this specification will serve to illustrate this invention.

A feed stock, for example, a hydrocarbon oil, is supplied from source 1 by line 2 to irradiation zone 3. 5–10 wt. percent of a beryllium compound, e.g. beryllium diethyl from source 4 is mixed with the hydrocarbon oil via line 5. The combined feed stream is then irradiated in zone 3, preferably to such an extent that the hydrocarbon oil receives at least 10⁴ ergs/gm./sec. of radiation energy.

Liquid phase conditions are preferably maintained and the pressure is, therefore, sufficient to maintain substantially liquid phase conditions. The irradiation can, however, be carried out while the reactants are in the vapor phase. A compound of beryllium, e.g. beryllium diethyl, can be used that is vaporous under the reaction conditions. The temperature can vary widely, temperatures in the range of 100 to 1000° F. being normal. The time of irradiation is sufficient to obtain the above dosages and will usually lie in the range of 10 to 10⁵ minutes.

If a solid material is used, it can be carried in and out of the reaction zone in a suspensoid type of operation known in the art. Alternatively, the catalyst or solid can be maintained as a fixed, fluid or gravitating bed within the reaction zone. It can be continuously removed from irradiation zone 3, either with the reactant or separately, for purposes of regeneration, retreatment and the like. It can, if desired, be periodically or continuously regenerated in place in irradiation zone 3.

The irradiated material is transferred from zone 3 by line 6 to a separation zone 7. The separation zone comprises means for recovering the catalyst or other solids used, such as by distillation and/or filtration. The beryllium or beryllium compound is also recovered and can be, if desired, recycled with or without the recovered solids by line 8. Separation zone 7 can also include means for removing and/or neutralizing radioactive materials. Such means can include storage tanks to permit decay of radioactivity, ion exchange apparatus, distillation columns, and solvent extraction units.

The products are also separated in zone 7 by conventional means. Thus, distillation, extraction, crystallization, adsorption, absorption, filtration and the like can be used. If desired, a portion of the product can be recycled by line 9. The treated product is removed by line 10.

*Example*

A virgin gas oil distilled from a paraffinic South Louisiana crude, having a 31.8° API gravity, a 34.4 SSU viscosity at 210° F., and containing 0.18 wt. percent sulfur, is admixed with a soluble beryllium compound, beryllium diethyl. The beryllium, specifically beryllium 9 present, amounts to about 10 wt. percent on feed.

The mixture is exposed to radiation by flowing it in a 2-inch I.D. aluminum pipe coiled about the fissionable material in an unmoderated nuclear reactor. The lineal length of travel of the mixture while under irradiation is 5 feet, and the flow rate is 2 v./v./hr. The temperature is about 800° F., and the average pressure is 600 p.s.i. The average neutron flux in the reaction zone totals about $10^{12}$ n/cm.²/sec. and is divided so that about 50% of the neutrons have velocities below 100 mev., 25% have velocities in the range of 100 to 10,000 mev., and 25% have velocities above 10,000 mev. The slow neutron captured by hydrogen in the hydrocarbon reaction mixture gives rise to the omission of about 2.23 mev. gamma rays which are energetic enough to photo-disintegrate beryllium into a neutron and two alpha particles.

Having described this invention, what is sought to be protected by Letters Patent is succinctly set forth in the following claims.

What is claimed is:

1. An improved method for effecting the conversion of organic materials by exposure to high intensity ionizing radiation which comprises forming an intimate mixture of finely divided beryllium with said organic material, said mixture containing at least 5–10 wt. percent water and said beryllium being in the form of a water soluble compound selected from the group consisting of beryllium halides and beryllium nitrate, irradiating said mixture with ionizing radiation comprising gamma rays of intensity at least about 10⁵ roentgens per hour, said gamma rays having an energy of at least 1.67 mev. for about 10 to 10⁵ minutes and separating the irradiated product from said beryllium and unreacted organic material.

2. An improved method for effecting the conversion of organic materials by exposure to high intensity ionizing radiation which comprises forming an intimate mixture of finely divided beryllium with said organic material, said mixture containing a porous solid hydrocarbon conversion catalyst, the beryllium being in an insoluble form on the surface of said catalyst to the extent of 0.1 to 5 wt. percent based on catalyst and being selected from the group consisting of beryllium aluminum silicates, beryllium carbonates, elemental beryllium and mixtures thereof, irradiating said mixture with ionizing radiation comprising gamma rays of intensity at least about 10⁵ roentgens per hour, said gamma rays having an energy of at least 1.67 mev. for about 10 to 10⁵ minutes and separating the irradiated product from said beryllium and unreacted organic material.

References Cited in the file of this patent

UNITED STATES PATENTS

| | | |
|---|---|---|
| 2,820,753 | Miller et al. | Jan. 21, 1958 |
| 2,872,396 | Wilson et al. | Feb. 3, 1959 |
| 2,904,484 | Houston et al. | Sept. 15, 1959 |
| 2,905,610 | Wigner | Sept. 22, 1959 |
| 2,909,488 | Colichman | Oct. 20, 1959 |

FOREIGN PATENTS

| | | |
|---|---|---|
| 630,726 | Great Britain | Mar. 30, 1936 |
| 697,601 | Great Britain | Sept. 23, 1953 |
| 708,901 | Great Britain | May 12, 1954 |

OTHER REFERENCES

Biochemical Journal, vol. 45 (1949); pages 543–546.

MDDC–1449, Atomic Energy Commission Document dated Nov. 12, 1947; pages 7–9.

Glasstone: Sourcebook on Atomic Energy, D. Van Nostrand Co., Inc. (1950); page 256.

Halliday: Introductory Nuclear Physics, John Wiley & Sons (1950), pages 108 and 217.

Mattauch: Nuclear Physics Tables; Interscience Publishers, N.Y. (1946), pages 126 and 161.